United States Patent [19]

Nakagawa

[11] Patent Number: 5,798,705
[45] Date of Patent: Aug. 25, 1998

[54] COMMUNICATION SYSTEM CAPABLE OF EASILY REFORMING TO HAVE COMMUNICATION UNITS

[75] Inventor: Tatsuhiko Nakagawa, Tokyo, Japan

[73] Assignee: NEC Corporation, Tokyo, Japan

[21] Appl. No.: 657,791

[22] Filed: May 31, 1996

[30] Foreign Application Priority Data

May 31, 1995 [JP] Japan .................. 7-132492

[51] Int. Cl.⁶ .............. H04B 7/00; H04L 12/00; H04K 1/00
[52] U.S. Cl. ............ 340/825.01; 340/826; 340/827; 340/825.52; 340/825.05; 370/351; 370/352; 370/357; 370/464; 370/498; 375/259; 375/260; 375/267
[58] Field of Search .............. 340/825.01, 826, 340/827, 825.05, 825.52; 370/351, 464, 498, 352, 357; 375/259, 260, 267

[56] References Cited

U.S. PATENT DOCUMENTS

| | | | |
|---|---|---|---|
| 4,417,348 | 11/1983 | Abbruscato | 375/40 |
| 4,656,645 | 4/1987 | Kaneko | 375/40 |
| 4,878,048 | 10/1989 | Gottesman et al. | 340/825.01 |
| 5,155,483 | 10/1992 | Morimoto | 340/825.03 |
| 5,321,394 | 6/1994 | Carlton et al. | 340/825.01 |
| 5,426,420 | 6/1995 | Nagler | 340/825.01 |
| 5,544,152 | 8/1996 | Obermanns et al. | 370/16 |

*Primary Examiner*—Brian Zimmerman
*Assistant Examiner*—Yonel Beaulieu
*Attorney, Agent, or Firm*—Ostrolenk, Faber, Gerb & Soffen, LLP

[57] ABSTRACT

A communication system include a communication unit comprising first and second optical interfaces 2 and 3, a lower order interface 4, an active selecting circuit 5, and a spare selecting circuit 6. The active selecting circuit 5 include a selector 13 which selects one of transmission signals from the first optical interface and a selector 17 to supply the one of transmission signals to a active transmission path 10 of the lower order interface 4. The spare selecting circuit include a selector 15 and the selector 17. The selector 15 selects one of transmission signals from the first optical interface and the selector 17 to supply the one of transmission signals to a spare transmission path 11 of the lower order interface 4. The selector 17 is connected to input and output terminals 19 and 20 connected to each other. The selector 17 selects transmission signal from the first optical interface to supply the transmission signal to the selectors 13 and 15. The communication system may comprise first and second communication units each of which is similar to the communication unit. The output terminal of the first communication unit is connected to the input terminal of the second communication unit. In addition, the input terminal of the first communication unit is supplied with a transmission signal from a spare communication unit.

4 Claims, 3 Drawing Sheets

COMMUNICATION SYSTEM CAPABLE OF EASILY REFORMING TO HAVE COMMUNICATION UNITS

FIELD OF THE INVENTION

The invention relates to a communication system, and more particularly, to a redundant communication system comprising active and spare transmission paths and active and spare selecting circuits.

BACKGROUND OF THE INVENTION

In the manner which will later be described more in detail, a conventional communication system comprises a communication unit which comprises first and second optical interfaces, a lower order interface, an active selecting circuit, and a spare selecting circuit. The first and second optical interfaces receive and transmit light signals. The first and second optical interfaces are supplied with light signals, respectively, to convert light signals into electric signals as transmission signals. Also, the first and second optical interfaces are supplied with the transmission signals, respectively, to convert the transmission signals into the light signals.

The lower order interface has active and spare transmission paths. The lower order interface receives and transmits a lower order signal. The lower order interface is supplied with the transmission signals to convert the transmission signals into the lower order signal. Also, the lower order interface is supplied with the lower order signal to convert the lower order signal into the transmission signals.

The active selecting circuit is connected between the first optical interface and the active transmission path of the lower order interface. The spare selecting circuit is connected among the second optical interface, the spare transmission path, and the active selecting circuit. The active selecting circuit selects one of transmission signals from the first and second optical interfaces to supply the one of transmission signals to the active transmission path of the lower order interface. Also, the active selecting circuit selects one of transmission signals from the lower order interface to supply the one of transmission signals to the first optical interfaces.

The spare selecting circuit selects one of transmission signals from the first and second optical interfaces to supply the one of transmission signals to the spare transmission path of the lower order interface. Also, the spare selecting circuit selects one of transmission signals from the lower order interface to supply the one of transmission signals to the second optical interfaces. The conventional communication system is called a 1 to 1 redundant communication system.

However, in the 1 to 1 redundant conventional communication system, it is impossible to reform a 1 to N redundant communication system which comprises first through N-th communication units where N represents an integer greater than two. As a result, the 1 to 1 redundant conventional communication system has a disadvantage in that a cost is increased if the 1 to 1 redundant conventional communication system comprises a plurality of communication units. For example, if the 1 to 1 redundant conventional communication system comprises four communication units, the 1 to 1 redundant conventional communication system needs eight optical interfaces. If the 1 to N redundant communication system comprises four communication units, the 1 to N redundant communication system has five optical interfaces.

SUMMARY OF THE INVENTION

Accordingly, it is an object of the invention to provide a communication system in which a cost is decreased if the communication system comprises a plurality of communication units.

It is another object of the invention to provide a communication system capable of easily reforming a communication system which comprises a plurality of communication units.

Other objects of the invention will become clear as the description proceeds.

According to an aspect of the invention, there is provided a communication system which comprises first and second active transmission paths for transmitting transmission signals, first and second spare transmission paths for transmitting transmission signals, active selecting means, and spare selecting means, wherein:

the active selecting means comprises;
a first selecting circuit for selecting one of transmission signals from the first active transmission path and the spare selecting means to supply the one of transmission signals to the second active transmission path;
the spare selecting means comprising;
a second selecting circuit and a third selecting circuit, the second selecting circuit being for selecting one of transmission signals from the first active transmission path and the third selecting circuit to supply the one of transmission signals to the second spare transmission path; the third selecting circuit having output and input terminals connected to each other for selecting transmission signal from the first spare transmission path to supply the transmission signal to the first and second selecting circuits.

According to another aspect of the invention, there is provided a communication system which comprises first and second communication units and a spare communication unit, each of the first and second communication units comprising first and second active transmission paths for transmitting transmission signals, first and second spare transmission paths for transmitting transmission signals, active selecting means, and spare selecting means, wherein:

the active selecting means comprises;
first selecting circuit for selecting one of transmission signals from the first active transmission path and the spare selecting means to supply the one of transmission signals to the second active transmission path;
the spare selecting means comprising;
a second selecting circuit and a third selecting circuit, the second selecting circuit being for selecting one of transmission signals from the first active transmission path and the third selecting circuit to supply the one of transmission signals to the second spare transmission path; the third selecting circuit having output and input terminals connected to each other for selecting transmission signal from the input terminal to supply the transmission signal to the first and second selecting circuits; the output of the first communication unit being connected to the input terminal of the second communication unit;
the spare communication unit being for receiving the transmission signal to supply the transmission signal to the input terminal of the first communication unit.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
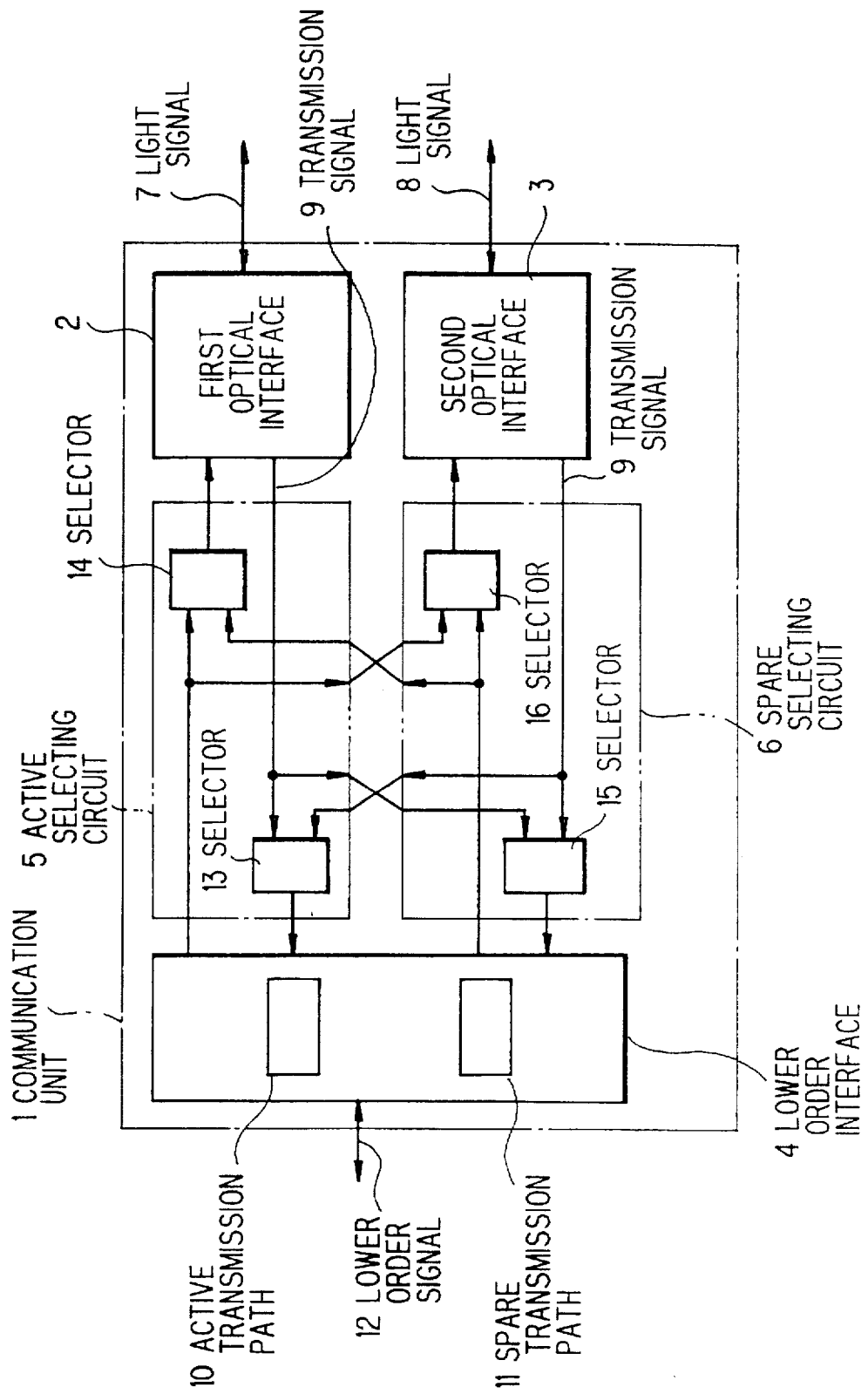
FIG. 1 is a block diagram of a conventional communication system.

Before explaining a communication system in the preferred embodiments according to the invention, the aforementioned conventional communication system will be explained in FIG. 1.

The conventional communication system comprises a communication unit 1 which comprises first and second optical interfaces 2 and 3, a lower order interface 4, an active selecting circuit 5, and a spare selecting circuit 6. The first and second optical interfaces 2 and 3 receive and transmit light signals 7 and 8. The first and second optical interfaces 2 and 3 are supplied with light signals 7 and 8, respectively, to convert light signals 7 and 8 into electric signals as transmission signals 9. Also, the first and second optical interfaces 2 and 3 are supplied with the transmission signals, respectively, to convert transmission signals into light signals 7 and 8.

The lower order interface 4 has active and spare transmission paths 10 and 11. The lower order interface 4 receives and transmits lower order signal 12. The lower order interface 4 is supplied with the transmission signals to convert the transmission signals into the lower order signal 12. Also, the lower order interface 4 is supplied with the lower order signal 12 to convert the lower order signal 12 into the transmission signals.

The active selecting circuit 5 is connected between the first optical interface 2 and the active transmission path 10 of the lower order interface 4. The spare selecting circuit 6 is connected among the second optical interface 3, the spare transmission path 11, and the active selecting circuit 5. The active selecting circuit 5 selects one of transmission signals from the first and second optical interfaces 2 and 3 to supply the one of transmission signals to the active transmission path 10 of the lower order interface 4. Also, the active selecting circuit 5 selects one of transmission signals from the lower order interface 4 to supply the one of transmission signals to the first optical interfaces 2.

The spare selecting circuit 6 selects one of transmission signals from the first and second optical interfaces 2 and 3 to supply the one of transmission signals to the spare transmission path 11 of the lower order interface 4. Also, the spare selecting circuit 6 selects one of transmission signals from the lower order interface 4 to supply the one of transmission signals to the second optical interfaces 3.

More particularly, the active selecting circuit 5 comprises first and second selectors 13 and 14. The spare selecting circuit 6 comprises third and fourth selectors 15 and 16. The first selectors 13 is connected among the first and second optical interfaces 2 and 3 and the active transmission path 10 of the lower order interface 4. The first selectors 13 selects one of transmission signals from the first and second optical interfaces 2 and 3 to supply the one of transmission signals to the active transmission path 10 of the lower order interface 4. The second selector 14 is connected between the lower order interface 4 and the first optical interfaces 2. The second selector 14 selects one of transmission signals from the lower order interface 4 to supply the one of transmission signals to the first optical interfaces 2.

The third selector 15 is connected among the first and second optical interfaces 2 and 3 and the spare transmission path 11 of the lower order interface 4. The third selector 15 selects one of transmission signals from the first and second optical interfaces 2 and 3 to supply the one of transmission signals to the spare transmission path 11 of the lower order interface 4. The fourth selector 16 is connected between the lower order interface 4 and the second optical interfaces 3. The fourth selector 16 selects one of transmission signals from the lower order interface 4 to supply the one of transmission signals to the second optical interfaces 3.

The conventional communication system is called the 1 to 1 redundant communication system. However, in the 1 to 1 redundant communication system, it is impossible to reform the 1 to N redundant communication system which comprises first through N-th communication units where N represents an integer than two. As a result, the 1 to 1 redundant communication system has a disadvantage in that a cost is increased if the 1 to 1 redundant communication system comprises a plurality of the communication units.

Figure 2:
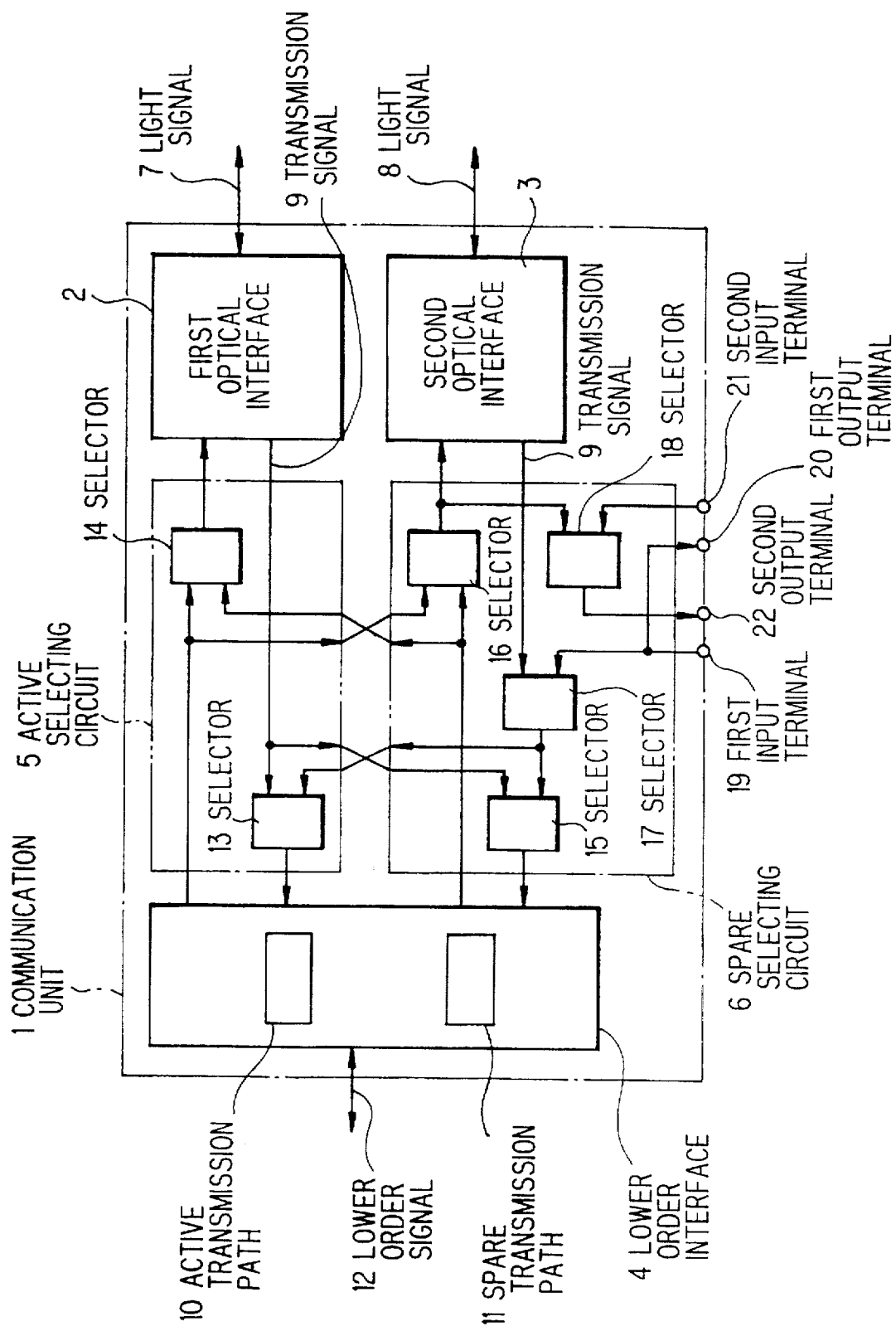
FIG. 2 is a block diagram of a communication system according to a first embodiment of the invention.

Referring to FIG. 2, the description will proceed to a communication system according to a first embodiment of the invention. Similar parts are designated by like reference numerals. The communication system comprises the communication unit 1 which comprises the first and second optical interfaces 2 and 3, the lower order interface 4, the active selecting circuit 5, and the spare selecting circuit 6. The lower order interface 4 has the active and spare transmission paths 10 and 11. The active selecting circuit 5 comprises first and second selectors 13 and 14. The spare selecting circuit 6 comprises the third and fourth selectors 15 and 16, fifth and sixth selectors 17 and 18, first input and output terminals 19 and 20 connected to each other, and second input and output terminals 21 and 22.

The fifth selector 17 has an input terminal which is connected to the second optical interface 3. The fifth selector 17 has another input terminal which is connected to the first input and output terminals 19 and 20. The fifth selector 17 has an output terminal which is connected to the third selector 15. The fifth selector 17 selects the transmission signal from the second optical interface 3 to supply the transmission signal to the first and third selectors 13 and 15. The third selector 15 selects one of the transmission signals from the first optical interface 2 and the fifth selector 17 to supply the one of the transmission signals to the spare transmission path 11 of the lower order interface 4. The first selector 13 selects one of the transmission signals from the first optical interface 2 and the fifth selector 17 to supply the one of the transmission signals to the active transmission path 10 of the lower order interface 4.

The sixth selector 18 has an input terminal which is connected to the fourth selector 16. The sixth selector 18 has another input terminal which is connected to the second input terminal 21. The sixth selector 18 has an output terminal which is connected to the second output terminal 22. The sixth selector 18 selects the transmission signal from the fourth selector 16 to supply the transmission signal to the second output terminal 22.

Figure 3:
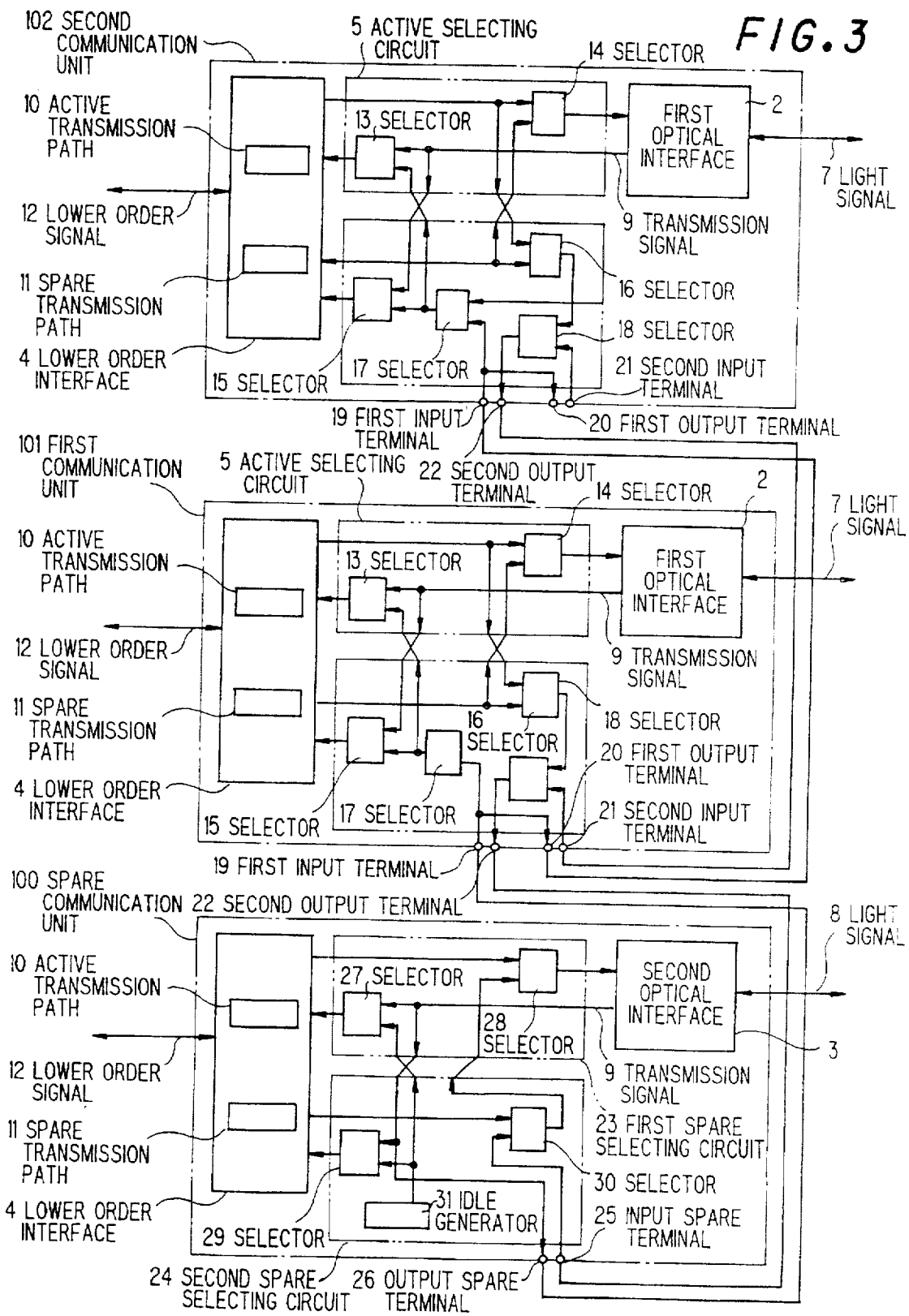
FIG. 3 is a block diagram of a communication system according to a second embodiment of the invention.

Referring to FIG. 3, the description will proceed to a communication system according to a second embodiment of the invention. Similar parts are designated by like reference numerals. The communication system comprises a first communication unit 101, a second communication unit 102, and a spare communication unit 100. Each of the first communication unit 101 and second communication unit 102 is similar to the communication unit 1 of FIG. 2 except the second optical interface 3. The first output terminal 20 of the first communication unit 101 is connected to the first input terminal 19 of the second communication unit 102. The second input terminal 21 of the first communication unit 101 is connected to the second output terminal 22 of the second communication unit 102.

The spare communication unit 100 comprises the second optical interface 3, first and second spare selecting circuits 23 and 24, the lower order interface 4, and input and output spare terminals 25 and 26. The first input terminal 19 of the first communication unit 101 is connected to the output spare terminal 26 of the spare communication unit 100. The second output terminal 22 of the first communication unit 101 is connected to the input spare terminal 25 of the spare communication unit 100. The output spare terminal 26 is connected to the second optical interface 3. The output spare terminal 26 outputs the transmission signal from the second optical interface 3 to the first input terminal 19 of the first communication unit 101. The input spare terminal 25 is connected to the second output terminal 22 of the first communication unit 101. The input spare terminal 25 is supplied with the transmission signal from the second output terminal 22 of the first communication unit 101.

The first spare selecting circuit 23 comprises a seventh selector 27 and an eighth selector 28. The second spare selecting circuit 24 comprises a ninth selector 29, a tenth selector 30, and an idle generator 31. The idle generator 31 generates an idle signal which erases a standby line access signal.

The seventh selector 27 is connected among the second optical interface 3, the lower order interface 4, and the idle generator 31. The seventh selector 27 selects one of the transmission signal from the second optical interface 3 and the idle signal from the idle generator 31 to supply the one of the transmission signal and the idle signal to the lower order interface 4. The eighth selector 28 is connected among the second optical interface 3, the lower order interface 4, and the tenth selector 30. The eighth selector 28 selects one of transmission signals of the lower order interface 4 and the tenth selector 30 to supply the one of transmission signals to the second optical interface 3.

The ninth selector 29 is connected among the second optical interface 3, the lower order interface 4, and the idle generator 31. The ninth selector 29 selects one of the transmission signal from the second optical interface 3 and the idle signal from the idle generator 31 to supply the one of the transmission signal and the idle signal to the lower order interface 4. The tenth selector 30 is connected among the lower order interface 4, the input spare terminal 25, and the eight selector 28. The tenth selector 30 selects one of the transmission signals from the lower order interface 4 and the input spare terminal 25 to supply the one of the transmission signals to the eight selector 28.

While the invention has thus far been described in conjunction with a few preferred embodiments thereof, it will readily be possible for those skilled in the art to put the invention into practice in various other manners. For example, the communication system may comprise first through N-th communication units where N represents a integer greater than three. The active and spare selecting circuits 5 and 6 and first and second spare selecting circuits 23 and 24 may be implemented by optical selectors. The second, fourth, and sixth selectors 14, 16, and 18 may be omitted.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A communication system which comprises first and second active transmission paths for transmitting transmission signals, first and second spare transmission paths for transmitting transmission signals, active selecting means, and spare selecting means, wherein:

said active selecting means comprises;

a first selecting circuit for selecting one of transmission signals from said first active transmission path and said spare selecting means to supply said one of transmission signals to said second active transmission path;

said spare selecting means comprising;

a second selecting circuit and a third selecting circuit, said second selecting circuit being for selecting one of transmission signals from said first active transmission path and said third selecting circuit to supply said one of transmission signals to said second spare transmission path; said third selecting circuit having output and input terminals connected to each other for selecting transmission signal from said first spare transmission path to supply said transmission signal to said first and second selecting circuits.

2. A communication system as claimed in the claim 1, wherein:

said first selecting circuit comprises a first selector connected among said first and second active transmission paths and said third selecting circuit for selecting one of transmission signals from said first active and said third selecting circuit to supply said one of transmission signals to said second active transmission path;

said second selecting circuit comprising a second selector connected among said first active transmission path, said third selecting circuit, and said second spare transmission path for selecting one of transmission signals from said first active transmission path and said third selecting circuit to supply said one of transmission signals to said second spare transmission path;

said third selecting circuit comprising a third selector and said input and output terminals connected to each other, said third selector connected among said first spare transmission path, said first and second selectors, and said input terminal for selecting transmission signal from said first spare transmission path to supply said transmission signal to said first and second selectors.

3. A communication system which comprises first and second communication units and a spare communication unit, each of said first and second communication units comprising first and second active transmission paths for transmitting transmission signals, first and second spare transmission paths for transmitting transmission signals, active selecting means, and spare selecting means, wherein:

said active selecting means comprises;

a first selecting circuit for selecting one of transmission signals from said first active transmission path and said spare selecting means to supply said one of transmission signals to said second active transmission path;

said spare selecting means comprising;

a second selecting circuit and a third selecting circuit, said second selecting circuit being for selecting one of transmission signals from said first active transmission path and said third selecting circuit to supply said one of transmission signals to said second spare transmission path; said third selecting circuit having output and input terminals connected to each other for selecting transmission signal from said input terminal to supply said transmission signal to said first and second selecting circuits; said output of said first communication unit being connected to said input terminal of said second communication unit;

said spare communication unit being for receiving said transmission signal to supply said transmission signal to said input terminal of said first communication unit.

4. A communication system as claimed in the claim 3, wherein:

said first selecting circuit comprises a first selector connected among said first and second active transmission paths and said third selecting circuit for selecting one of transmission signals from said first active and said third selecting circuit to supply said one of transmission signals to said second active transmission path;

said second selecting circuit comprising a second selector connected among said first active transmission path, said third selecting circuit, and said second spare transmission path for selecting one of transmission signals from said first active transmission path and said third selecting circuit to supply said one of transmission signals to said second spare transmission path;

said third selecting circuit comprising a third selector and said input and output terminals connected to each other, said third selector connected among said first and second selectors and said input terminal for selecting transmission signal from said input terminal to supply said transmission signal to said first and second selectors.

* * * * *